US010482594B2

(12) United States Patent
Potter et al.

(10) Patent No.: US 10,482,594 B2
(45) Date of Patent: Nov. 19, 2019

(54) MULTI-PERSPECTIVE IMAGING SYSTEM AND METHOD

(71) Applicant: Apple Inc., Cupertino, CA (US)

(72) Inventors: Daniel E. Potter, San Jose, CA (US); Arthur Y. Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 15/712,600

(22) Filed: Sep. 22, 2017

(65) Prior Publication Data

US 2018/0089816 A1     Mar. 29, 2018

Related U.S. Application Data

(60) Provisional application No. 62/398,678, filed on Sep. 23, 2016.

(51) Int. Cl.
*G06T 7/00*          (2017.01)
*G06T 7/73*          (2017.01)
(Continued)

(52) U.S. Cl.
CPC .......... *G06T 7/001* (2013.01); *G06K 9/00791* (2013.01); *G06T 1/0007* (2013.01);
(Continued)

(58) Field of Classification Search
CPC ......... G06T 7/001; G06T 7/74; G06T 1/0007; G06T 2207/30252; H04N 19/17; H04N 19/597; G06K 9/00791
See application file for complete search history.

(56) References Cited

U.S. PATENT DOCUMENTS 5,933,535 A *   8/1999   Lee ...................... G06F 17/153
                                                                  345/648
7,035,453 B2 *   4/2006   Liu ...................... H04N 5/2627
                                                                  375/240.12

(Continued)

OTHER PUBLICATIONS

Zhang et al., "A Self-Reconfigurable Camera Array," Eurographics Symposium on Rendering, 2004, H.W. Jensen, A. Keller (Editors), 12 pages.

(Continued)

*Primary Examiner* — Mia M Thomas
(74) *Attorney, Agent, or Firm* — Polsinelli PC

(57) ABSTRACT

A system includes a processor to capture a first image of a scene by a first imaging device of the array of imaging devices, capture a second image of the scene by a second imaging device of the array of imaging devices, perform image analysis of the first image and the second image and determining that an object is present in the first image and the object is present in the second image, the first image representing a first perspective of the object and the second image representing a second perspective of the object different from the first perspective of the object, classify the object with a classification based on a list of known objects and weight an object portion of the first image and an object portion of the second image based on the classification, compress the first image and the second image based on the weighting, encode the first image and the second image as multi-perspective image data, and store the multi-perspective image data in the non-transitory computer-readable medium based on the classification.

22 Claims, 6 Drawing Sheets

(51) Int. Cl.

| | | |
|---|---|---|
| *G06T 1/00* | (2006.01) | |
| *G06K 9/00* | (2006.01) | |
| *H04N 19/597* | (2014.01) | |
| *H04N 19/17* | (2014.01) | |
| *H04N 19/102* | (2014.01) | |
| *H04N 19/136* | (2014.01) | |

(52) U.S. Cl.
CPC .............. *G06T 7/74* (2017.01); *H04N 19/102* (2014.11); *H04N 19/136* (2014.11); *H04N 19/17* (2014.11); *H04N 19/597* (2014.11); *G06T 2207/30252* (2013.01)

(56) References Cited

U.S. PATENT DOCUMENTS

| | | | | |
|---|---|---|---|---|
| 7,299,190 | B2* | 11/2007 | Thumpudi | G10L 19/008 704/200.1 |
| 7,899,616 | B2* | 3/2011 | Breed | G08G 1/161 340/995.1 |
| 8,031,767 | B2* | 10/2011 | Lee | H04N 19/136 375/240.01 |
| 8,248,458 | B2* | 8/2012 | Schowengerdt | G02B 26/005 348/43 |
| 8,311,089 | B2* | 11/2012 | Ishikawa | H04N 21/21805 341/110 |
| 8,615,106 | B2* | 12/2013 | Wedge | G06T 7/292 382/103 |
| 8,619,148 | B1* | 12/2013 | Watts | G06T 5/006 348/218.1 |
| 8,836,783 | B2* | 9/2014 | Rondinelli | H04N 5/23238 348/143 |
| 8,855,418 | B2* | 10/2014 | Christiansen | G06T 9/00 345/426 |
| 8,942,547 | B2* | 1/2015 | Maruyama | H04N 5/7755 386/326 |
| 9,064,295 | B2* | 6/2015 | Sassi | G06T 9/00 |
| 9,197,889 | B2* | 11/2015 | Berbecel | H04N 21/2365 |
| 9,361,660 | B2* | 6/2016 | Tanaka | G06F 3/005 |
| 9,361,675 | B2* | 6/2016 | Kido | G06T 3/00 |
| 9,509,974 | B2* | 11/2016 | Wang | H04N 19/597 |
| 2005/0131660 | A1* | 6/2005 | Yadegar | G06T 9/001 703/2 |
| 2005/0249401 | A1* | 11/2005 | Bahlmann | G06K 9/6256 382/159 |
| 2010/0103265 | A1* | 4/2010 | Yu | G07C 5/0866 348/148 |
| 2011/0122224 | A1* | 5/2011 | Lou | H04N 19/597 348/42 |
| 2011/0216179 | A1* | 9/2011 | Dialameh | A61H 3/061 348/62 |
| 2011/0249094 | A1* | 10/2011 | Wang | H04N 19/597 348/46 |
| 2012/0076401 | A1* | 3/2012 | Sanchez | G06K 9/4676 382/159 |
| 2012/0286974 | A1* | 11/2012 | Claussen | G08G 1/162 340/935 |
| 2013/0121571 | A1* | 5/2013 | Gokturk | G06Q 30/0603 382/165 |
| 2016/0044284 | A1* | 2/2016 | Goseberg | H04N 5/23238 348/148 |
| 2016/0173805 | A1* | 6/2016 | Claus | H04N 17/004 348/148 |
| 2017/0076438 | A1* | 3/2017 | Kottenstette | G06K 9/00637 |
| 2017/0195568 | A1* | 7/2017 | Leizerovich, Jr. | H04N 5/23238 |

OTHER PUBLICATIONS

Singh et al., "Object Based Real Time Lossless Video Compression," *International Journal of Emerging Technology and Advanced Engineering*, vol. 2, No. 7, Jul. 2012, pp. 193-197.

Joshi et al., "Synthetic Aperture Tracking: Tracking through Occlusions," IEEE 11th International Conference on Computer Vision, ICCV 2007, Rio de Janeiro, Brazil, Oct. 14-20, 2007, 8 pages.

Wilburn, "High Performance Imaging Using Arrays of Inexpensive Cameras," A Dissertation Submitted to the Department of Electrical Engineering and the Committee on Graduate Studies of Stanford University in Partial Fulfillment of the Requirements for the Degree of Doctor of Philosophy, Dec. 2004, 128 pages.

Thinkware Dash Cam, "Why We Need A Dash Cam," 9 pages, http://www.thinkware.com/WhyGetADashCam, accessed Aug. 18, 2016.

BlackVue, DR650S-2CH Dual-Channel Cloud Dashcam, 11 pages, https://www.blackvue.com/dr650s-2ch/, accessed Aug. 18, 2016.

Thinkware Dash Cam, "F770," 7 pages, http://www.thinkware.com/Products/Dashcam/F770, accessed Aug. 18, 2016.

NORPIX Digital Video Recording Software, "JPEG Compression Recording from 10 Cameras," 2 pages, https://www.norpix.com/applications/jpegcompression.php, access Sep. 22, 2017.

Lee et al., "Vision Perceptual Based Rate Control Algorithm for Multi-View Video Coding," Proceedings of 2011 International Conference on System Science and Engineering, Macau, China—Jun. 2011, 4 pages.

Lei et al., Multilevel region of interest guided bit allocation for multiview video coding, *Optik*, vol. 125 (2014), pp. 39-43.

Zhang et al., "Depth Based Region of Interest Extraction for Multi-View Video Coding," Proceedings of the Eighth International Conference on Machine Learning and Cybernetics, Baoding, Jul. 12-15, 2009, 7 pages.

* cited by examiner

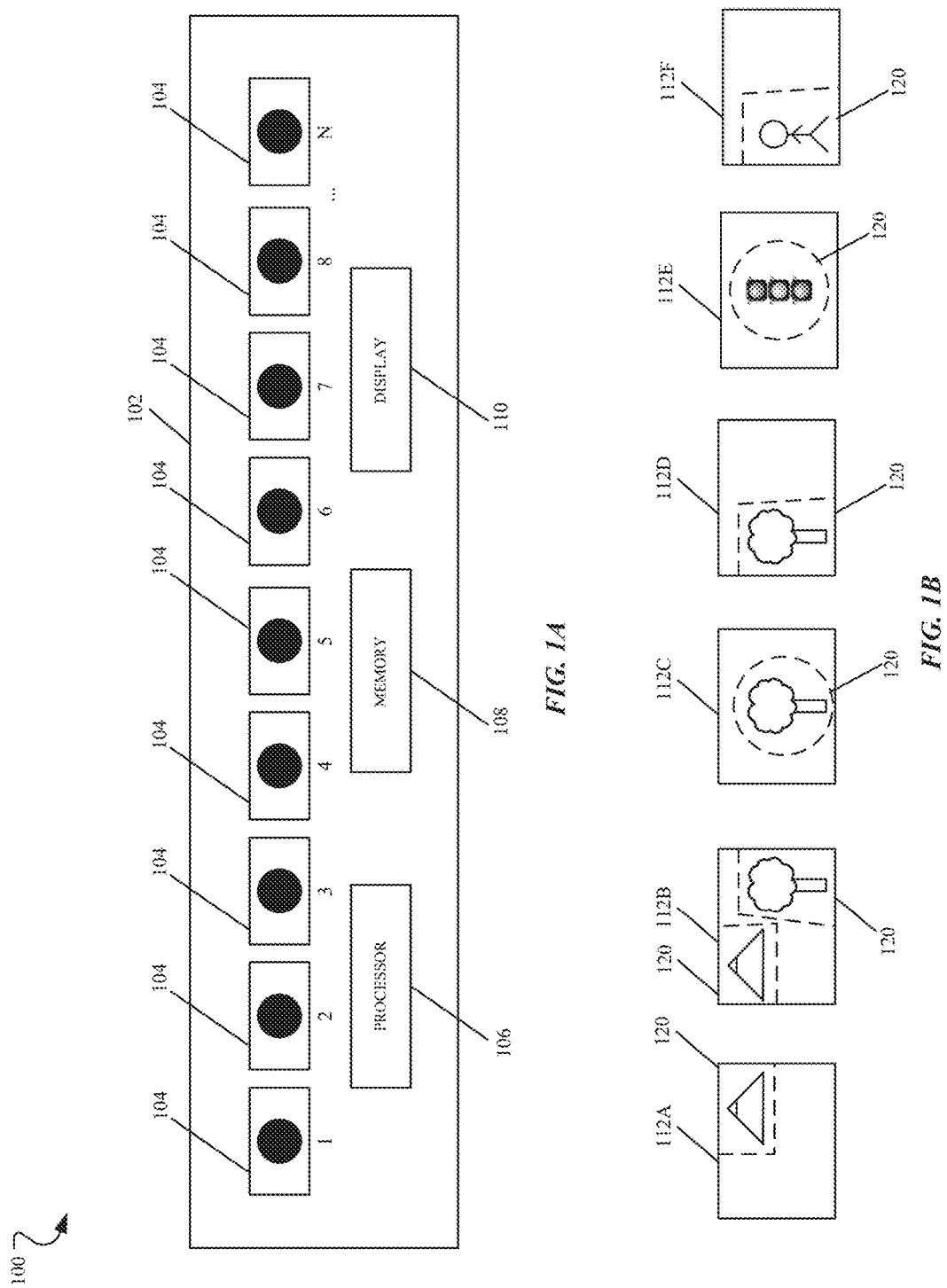

| Image ID | Object | Classification | Weight | Location |
|---|---|---|---|---|
| 001 | △ | Mountain | 0.5 | Denver, CO |
| 002 | 🌳 | Tree | 0.25 | Denver, CO |
| 003 | 🚥 | Traffic Signal | 0.4 | Chicago, IL |
| 004 | 🚶 | Pedestrian | 0.7 | Chicago, IL |

*FIG. 1C*

MULTI-PERSPECTIVE IMAGING SYSTEM AND METHOD

CROSS REFERENCE TO RELATED APPLICATIONS

This application is related to and claims priority under 35 U.S.C. § 119(e) from U.S. Patent Application No. 62/398,678, filed Sep. 23, 2016, titled "MULTI-PERSPECTIVE IMAGING SYSTEM AND METHOD," the entire contents of which are incorporated herein by reference for all purposes.

FIELD

The described embodiments relate generally to a multi-perspective imaging system that captures and processes images of a scene from multiple perspectives. The multi-perspective imaging system may be incorporated within a vehicle.

BACKGROUND

Conventionally, vehicle mounted cameras are limited devices that may be mounted on a dashboard of a vehicle to record the view outside of the vehicle. However, these cameras have a limited perspective, field of view, and resolution. Additionally, they may obstruct the view of the cabin and have limited storage. Images of the view outside the vehicle obtained by handheld devices of passengers of the vehicle can be awkward and out of focus. In short, vehicle based imaging would benefit from many improvements.

SUMMARY

A system includes a processor to execute an image capture application. The image capture application may receive images from an array of imaging devices, each image depicting a different perspective of an object at approximately the same time. The image capture application may classify and weight the images of the object and store the images of the object based on the classification and/or the weight. The image capture application may be executed by a computing device that captures images from the array of imaging devices arranged in a particular arrangement on an exterior of a vehicle.

According to one embodiment, a system includes an array of imaging devices, a processor, and a non-transitory computer-readable medium storing instructions that, when executed by the processor, cause the processor to perform operations including capturing a first image of a scene by a first imaging device of the array of imaging devices, capturing a second image of the scene by a second imaging device of the array of imaging devices, performing image analysis of the first image and the second image and determining that an object is present in the first image and the object is present in the second image, the first image representing a first perspective of the object and the second image representing a second perspective of the object different from the first perspective of the object, classifying the object with a classification based on a list of known objects and weighting an object portion of the first image and an object portion of the second image based on the classification, compressing the first image and the second image based on the weighting, encoding the first image and the second image as multi-perspective image data, and storing the multi-perspective image data in the non-transitory computer-readable medium based on the classification.

According to a further embodiment, a method includes capturing, by a processor, a first image of a scene by a first imaging device of the array of imaging devices, capturing, by the processor, a second image of the scene by a second imaging device of the array of imaging devices, performing, by the processor, image analysis of the first image and the second image and determining that an object is present in the first image and the object is present in the second image, the first image representing a first perspective of the object and the second image representing a second perspective of the object different from the first perspective of the object, classifying, by the processor, the object with a classification based on a list of known objects and weighting an object portion of the first image and an object portion of the second image based on the classification, compressing, by the processor, the first image and the second image based on the weighting, encoding, by the processor, the first image and the second image as multi-perspective image data, and storing, by the processor, the multi-perspective image data in the non-transitory computer-readable medium based on the classification.

According to another embodiment, a non-transitory computer-readable medium includes instructions stored thereon that, when executed by a processor, cause the processor to perform operations including capturing a first image of a scene by a first imaging device of the array of imaging devices, capturing a second image of the scene by a second imaging device of the array of imaging devices, performing image analysis of the first image and the second image and determining that an object is present in the first image and the object is present in the second image, the first image representing a first perspective of the object and the second image representing a second perspective of the object different from the first perspective of the object, classifying the object with a classification based on a list of known objects and weighting an object portion of the first image and an object portion of the second image based on the classification, compressing the first image and the second image based on the weighting, encoding the first image and the second image as multi-perspective image data, and storing the multi-perspective image data in the non-transitory computer-readable medium based on the classification.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1A illustrates a block diagram of a multi-perspective imaging system according to an example embodiment.

FIG. 1B illustrates example images captured by the multi-perspective imaging system according to an example embodiment.

FIG. 1C illustrates an example database table of the multi-perspective imaging system according to an example embodiment.

DETAILED DESCRIPTION

Figure 2:
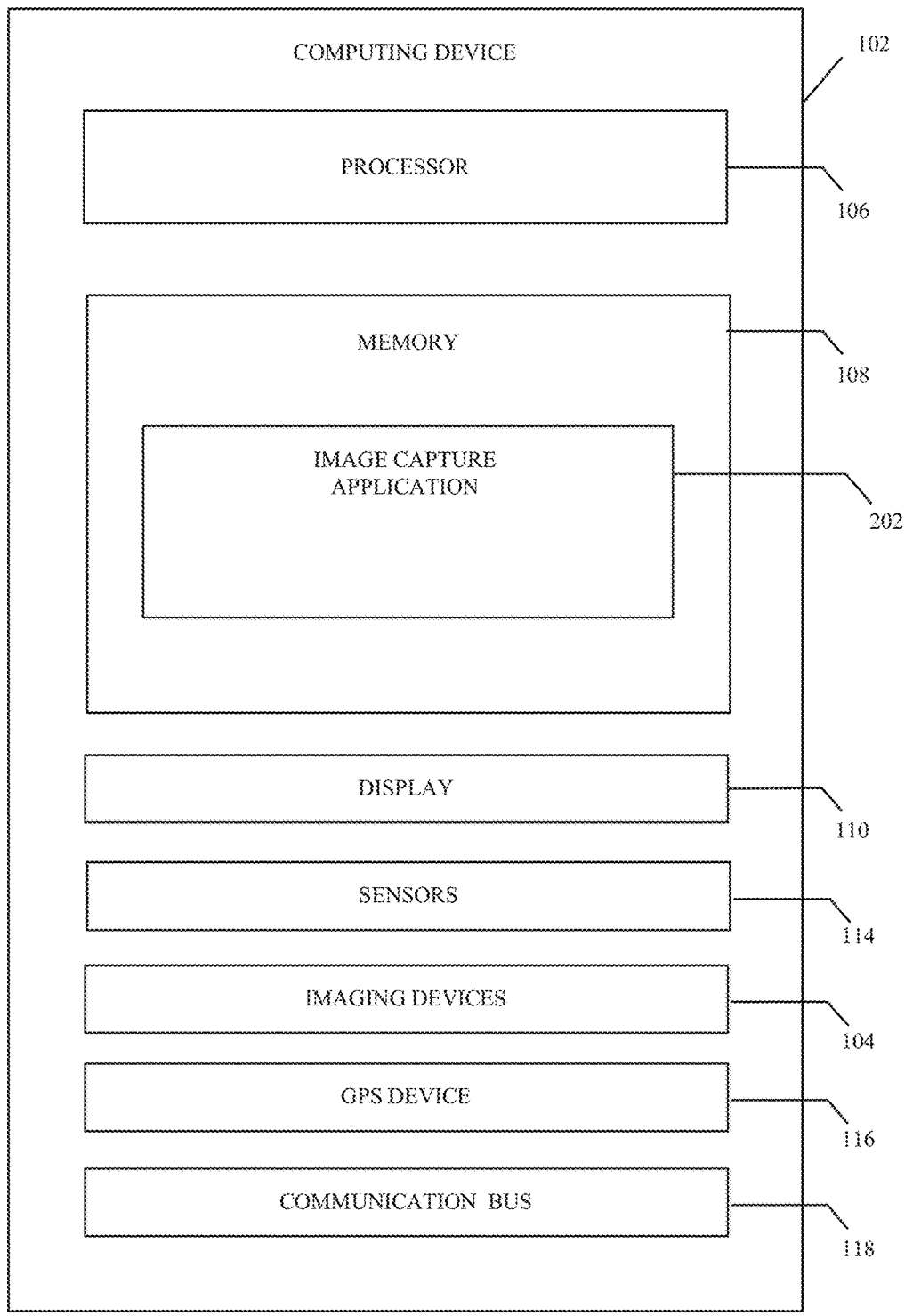
FIG. 2 illustrates a block diagram of a computing device according to an example embodiment.

According to an example embodiment, a multi-perspective imaging system includes an array of imaging devices and a computing device having an image capture application that captures images using the array of imaging devices. The image capture application may receive images from the array of imaging devices, each image depicting a different perspective of an object at approximately the same time. The image capture application may perform image analysis on the object and classify the object with a classification based on a list of known objects and weight an object portion of the images based on the classification and other information such as depth information regarding the object and a location of the object. The image capture application may compress the images based on the classification and/or the weight, encode the images as multi-perspective image data, and store the multi-perspective image data based on the classification and/or the weight. The objects captured by the array of imaging devices may be objects in view of a vehicle such as pedestrians, road signs, obstacles, vehicles, animals, and scenery, among other objects. In one embodiment, the vehicle may be an autonomous vehicle.

For the purpose of promoting an understanding of the principles of the present disclosure, reference is made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

There are many situations when taking still images and/or video from a vehicle may be beneficial. The images and/or video may be used to document and capture information associated with the vehicle including activities of the vehicle. The environment around a vehicle may provide occupants of the vehicle with information associated with the road, other vehicles, obstacles, and vehicle surroundings. The vehicle may include an array of imaging devices, e.g., cameras, mounted on the vehicle that provide a multi-perspective, time-synchronized video or still image of an environment around the vehicle. The imaging devices may be mounted on an exterior of the vehicle and/or interior of the vehicle and may be integrated in the design of the vehicle. The imaging devices may be connected to the electrical infrastructure provided by the vehicle and powered by the vehicle. Additionally, the imaging devices may be associated with the multi-perspective imaging system and/or may be part of a visual system for the vehicle. The spatial position, focal length, and orientation of the optical axis of each imaging device in the array of imaging devices is known and designed to provide an overlapped field of view. The array of imaging devices provides panoramic imagery, a wide field of view, high-resolution imagery, and the multi-perspective image of the environment around the vehicle. The image data may be stored based on objects found in the images.

In one example, the images and/or video captured by the array of imaging devices may be processed by the computing device to allow a moment of time to be viewed from multiple perspectives. As an example, the array of imaging devices may capture video of a scene from imaging devices mounted on an exterior of a first side of the vehicle, video of the scene from imaging devices mounted on a front of the vehicle, video of the scene from imaging devices mounted on an exterior of a second side of the vehicle, and video of the scene from imaging devices mounted on a rear of the vehicle. The computing device may display the video of the scene from the first side of the vehicle, transition to the video of the scene from the front of the vehicle, transition to the video of the scene from the second side of the vehicle, and transition to the video of the scene from the rear of the vehicle. The computing device may display the video from any viewpoint or perspective and may transition the video from one viewpoint or perspective to another viewpoint while it is being displayed.

In another embodiment, the computing device may generate a distance map of the scene or environment based on the relative spatial locations and orientations of the imaging devices in the array. In addition, the computing device may determine bidirectional reflectance distribution function (BRDF) information of surfaces of objects in the scene or environment using the information obtained by the array of imaging devices from multiple perspectives. This may allow the computing device to determine illumination sources in view of the array of imaging devices, e.g., headlights from the vehicle, streetlights, or sunlight. The multi-perspective imaging system may be activated by an occupant of the vehicle through selection of a button on a touch screen, via fingerprint sensor authentication, voice activation, and/or gesture activation. Alternatively, the multi-perspective imaging system may be activated based on a location of the vehicle, movement of the vehicle, or an object determined to be in view of an imaging device of the multi-perspective imaging system.

The multi-perspective imaging system may determine whether a particular image captured by the array of imaging devices is of particular importance and determine whether to store the particular image in memory and/or whether to compress the particular image based on the particular importance. The particular importance, or weighting, may be based on computer vision and image analysis of the particular image. The multi-perspective image system may include a database of classes of objects, landscapes, shapes, colors, and locations that may be identified to intelligently store images and/or video. For a particular period of time, the multi-perspective imaging system may have a particular storage threshold and may automatically edit, discard, and/or compress images and/or video to fit within the particular storage threshold. As an example, the multi-perspective imaging system may store one terabyte of data every X minutes. If certain images are deemed to be less important, they may be compressed and/or discarded. In addition, the multi-perspective image system may archive images in other memory that may be a network accessible storage device or system. When storage space becomes limited, the multi-perspective image system may discard or archive images. Images may be archived based on their date, their weighting, and other factors.

The multi-perspective imaging system provides robust detection of objects in images, the object captured in the images from a variety of different perspectives. The multi-perspective imaging system intelligently stores the images in memory based on classification and weighting of the objects in the images.

Users can benefit from detection of a particular object in an image. For example, personal data can be used to more accurately detect the particular object in an image using sets of desired classes of objects in images and/or location information. Accordingly, use of such personal data enables users to influence and control delivered content.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

These and other embodiments are discussed below with reference to FIGS. 1A-5. However, those skilled in the art will readily appreciate that the detailed description given herein with respect to these figures is for explanatory purposes only and should not be construed as limiting.

FIG. 1A illustrates a block diagram of a multi-perspective imaging system 100 according to an example embodiment. The multi-perspective imaging system 100 includes a computing device 102 that may be within a vehicle. The computing device 102 may be embedded in a vehicle or associated with the vehicle comprising a machine that transports people and/or cargo including a terrestrial motor vehicle, a watercraft, and an aircraft, among other vehicles. The vehicle may include an engine such as an internal combustion engine, an electric motor, or may be in a hybrid configuration.

In addition, the multi-perspective imaging system 100 includes an array of imaging devices 104 such as imaging device 1, imaging device 2, imaging device 3 . . . imaging device N. The array of imaging devices 104 include high-definition cameras and may be used to capture images and/or video including two-dimensional images and/or three-dimensional images including a two-dimensional image of an object or a three-dimensional image of an object, a height of an object, a shape of an object, an orientation of an object, and other visual aspects and characteristics associated with the object. The array of imaging devices 104 may be mounted on the vehicle. The array of imaging devices 104 may have a variety of arrangements including an array of imaging devices located on an exterior of the vehicle, an array of imaging devices located on an interior of the vehicle, a multidimensional array of imaging devices located on the interior of the vehicle, and/or a multidimensional array of imaging devices located on the exterior of the vehicle, among others. FIG. 1A shows one possible arrangement including a number of imaging devices that are located on an axis parallel to one another and having a particular distance between each imaging device. In this instance, the array of imaging devices 104 may located on a side of the vehicle, e.g., on doors of the vehicle. The computing device 102 may include a processor 106, memory 108, and a display 110.

Each imaging device in the array of imaging devices 104 may capture images and/or video of a scene at approximately the same time from multiple, different perspectives. The scene may include objects. As an example, FIG. 1B shows images 112A-112F captured by the array of imaging devices 104. As shown in a first image 112A, a first imaging device of the array of imaging devices 104 captures an image of a mountain in a background of a view or scene. The computing device 102 classifies the object as a mountain and weights an object portion 120 of the image illustrated as the area within the dotted lines. A second image 112B captured by a second imaging device of the array of imaging devices 104 captures the mountain in the background from another perspective and also captures a tree in a foreground of a view. The computing device 102 classifies the mountain and the tree and weights each object portion 120 of the image. A third image 112C captured by a third imaging device of the array of imaging devices 104 captures the tree in a foreground of a view from another perspective. The computing device 102 classifies the tree in the third image 112C and the fourth image 112D and weights the object portion 120 of the image. In the second image 112B, the tree is shown on a right side of the image. In the third image 112C, the tree is in a center of the image. A fourth image 112D captured by a fourth imaging device of the array of imaging devices 104 captures the tree in a foreground of a view from another perspective.

A fifth image 112E captured by a fifth imaging device of the array of imaging devices 104 captures a traffic signal in a foreground of a view. The fifth image may be from a different scene from the images 112A-112D. A sixth image 112F captured by a sixth imaging device of the array of imaging devices 104 captures a pedestrian in a foreground of a view. The sixth image may be from the same scene as the fifth image and the pedestrian may be waiting to cross a crosswalk associated with the traffic signal in the fifth image.

As an example, the object portion of the image illustrated as the area within the dotted lines may be assigned a weight having a value between 0.00-1.00, where 0.00 is the lowest weight that may be assigned to the object portion of the image and 1.00 is the highest weight that may be assigned to the object portion of the image. The weight may be based on the classification and other information available to the computing device such as metadata associated with the image. The object portion of the image within the dotted lines may comprise a subset or section of the image that includes the object that is classified as a particular object and represents a perspective of the object.

The images 112A-112F may be captured by a different imaging device of the array of imaging devices 104 and/or may be captured by the same imaging device of the array of imaging devices 104. In addition, the images 112A-112F may be captured when the array of imaging devices 104 is in motion when mounted on the vehicle and/or when the array of imaging devices 104 is stationary.

The computing device 102 may determine that an object is present in each image, such as the mountain, the tree, the traffic signal, and/or the pedestrian and may classify the object based on a list of known objects. The computing device 102 may weight an object portion of each image based on the classification and may compress and/or discard each image based on the classification and/or the weight. The images may be encoded and stored in the memory 108 based on the classification and/or the weight. In addition, the images may be decoded by the computing device 102 and displayed on the display 110.

The computing device 102 and vehicle may communicate in various ways or combinations thereof. When in relative close proximity, the vehicle and the computing device 102 may use Bluetooth, WiFi, or other such short range wireless methods. At longer ranges, the computing device 102 and the other computing devices may communicate using a cellular communications network or another communications network. Accordingly, communication may involve the Internet, an intranet, a cellular communications network, a WiFi network, a packet network, a short-range wireless network, or another wired and/or wireless communication network or a combination of any of the foregoing. As an example, the computing device 102 and the other computing devices may communicate data in packets, messages, or other communications using a common protocol, e.g., Hypertext Transfer Protocol (HTTP) and/or Hypertext Transfer Protocol Secure (HTTPS). The computing device 102 and the other computing devices may communicate with other optional server computing devices associated with the multi-perspective imaging system 100.

The vehicle and/or the computing device 102 may include Bluetooth Low Energy (BLE), Bluetooth LE, Bluetooth Smart) functionality based on the Bluetooth 4.0 specification or another specification. According to an example embodiment, the computing device 102 is paired and communicates wirelessly using a short range wireless network, e.g., Bluetooth (IEEE Standard 802.15). The short range wireless network may be a wireless personal area network (WPAN).

In another example, the vehicle may create a personal area network and/or a mesh network for communicating with the computing device 102. Additionally, the vehicle and the computing device 102 may communicate using Zigbee, Wi-Fi, near field magnetic inductance, sonic (sound) waves, and/or infrared (light) waves, among others.

The multi-perspective imaging system 100 further includes a database storing data including images and information associated with the images, e.g., a set of classifications of objects and representations of objects in the images. As shown in FIG. 1A, in one embodiment, the multi-perspective imaging system 100 includes the memory 108 that may include a database that may have an organized collection of data. As an example, the memory 108 may include a first database that stores images captured by the array of imaging devices 104, a second database that includes information associated with a set of objects to detect in images captured by the array of imaging devices 104, and a third database that stores representations of objects found in images, classifications of objects found in images, weight information for object portions located in images, and other metadata such as location information. The database may include other databases and information.

An example of a table of the third database is shown in FIG. 1C. A first image identified with image identification (ID) 001 may include a mountain object portion that is classified as a "Mountain." This object portion may have a weight of 0.5 and the image may have metadata that indicates that the image was captured in Denver, Colo. A second image identified with image ID 002 may include a tree object portion that is classified as a "Tree." This object portion may have a weight of 0.25 and the image may have metadata that indicates that the image was captured in Denver, Colo. A third image identified with image ID 003 may include a traffic signal object portion that is classified as a "Traffic Signal." The object portion may have a weight of 0.4 and the image may have metadata that indicates that the image was captured in Chicago, Ill. A fourth image identified with image ID 004 may include a pedestrian object portion that is classified as a "Pedestrian." The object portion may have a weight of 0.7 and the image may have metadata that indicates that the image was captured in Chicago, Ill.

The database may comprise a non-relational database and/or a relational database. As an example, the information may be stored in files comprising tables (e.g., a spreadsheet), database tables, a relational database management system (RDBMS), a key-value store, an open source distributed database management system such as a Not only SQL (NoSQL) database management system, an in-memory database (IMDB) management system, or another appropriate database management system. The computing device 102 may store information and data in the memory 108 and the computing device 102 may retrieve information and data from the memory 108.

FIGS. 1A and 2 illustrate a block diagram of the computing device 102 according to an example embodiment. The computing device 102 may have hardware components including the processor 106 and the memory 108. The processor 106 processes machine/computer-readable executable instructions and data, and the memory 108 stores machine/computer-readable executable instructions and data including applications, including an image capture application 202. The processor 106 and memory 108 are hardware. The processor 106 may be a processing unit. In one embodiment, the processor 106 includes a secure enclave processor (SEP). The SEP stores and protects biometric information and password information, among other information. The memory 108 includes random access memory (RAM) and non-transitory memory, e.g., a non-transitory computer-readable storage medium such as flash storages or hard drives. The non-transitory memory may include any tangible computer-readable medium including, for example, magnetic and/or optical disks, flash drives, and the like.

Alternatively, the computing device 102 may be a dedicated electronic device having a processor and memory. The computing device 102 may be an electronic device having operational units or modules arranged to perform various operations of the presently disclosed technology.

The operational units of the computing device 102 are implemented by hardware or a combination of hardware and software to carry out principles of the present disclosure. It will be understood by persons of skill in the art that the operational units shown in FIG. 3 may be combined or separated into sub-blocks to implement the principles of the present disclosure. Therefore, the description herein supports any possible combination or separation or further definition of the operational units.

As shown in FIG. 2, the database may be stored in memory 108 or may be stored in another location. In one example, the location may be a local location available to the computing device 102 and/or the location may be a network accessible location.

The computing device 102 further can include touch screen display devices 110, such as a liquid-crystal display (LCD) for receiving input and displaying output, sensors 114, cameras or imaging devices 104, a global positioning system (GPS) device 116, and a communication bus 118. The computing device 102 may include wireless communication devices for communicating including a wireless transceiver, a cellular transceiver, a Bluetooth transceiver, and others.

The touch screen display devices 110 may be for receiving input including activation of the array of imaging devices 104 and displaying output including images and/or video captured by the array of imaging devices 104. The sensors 114 and the imaging devices 104 may be used for biometric identification and authentication to activate the array of imaging devices. The sensors 114 may include fingerprint sensors, iris recognition devices, eye vein verification devices, microphones, load or weight sensors (e.g., a strain gauge), pressure sensors, electrocardiogram (ECG) sensors, radar devices, lidar devices, and near-infrared devices, among others. The imaging devices 104 may be coupled with the processor 106 and the sensors 114 for object recognition. The touch screen display devices 110 and/or the imaging devices 104 may be used to receive gestures. The microphones may be used to receive verbal commands such as activation of the array of imaging devices 104. The global positioning system device 116 may receive GPS signals and thereby determine a current location of the computing device 102 and the array of imaging devices 104. The current location may be the location of the vehicle that the array of imaging devices 104 is incorporated within.

Figure 3:
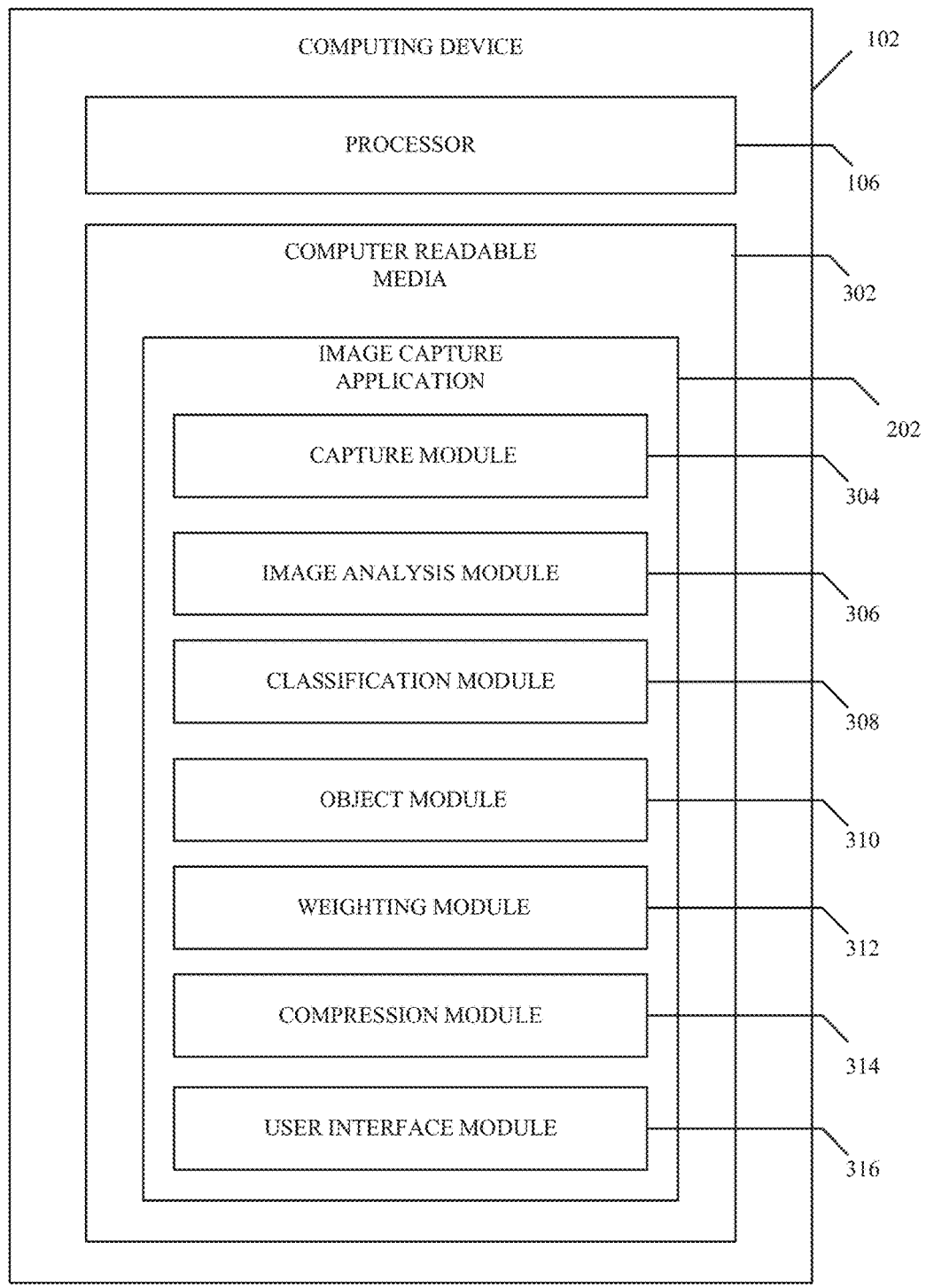
FIG. 3 illustrates a block diagram of an image capture application according to an example embodiment.

FIG. 3 illustrates a block diagram of the image capture application 202 of the computing device 102 according to an example embodiment. The computing device 102 includes computer readable media (CRM) 302 in memory 108 on which the image capture application 202 is stored. The computer readable media 302 may include volatile media, nonvolatile media, removable media, non-removable media, and/or another available medium that can be accessed by the processor 106.

By way of example and not limitation, the computer readable media 302 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The image capture application 202 includes a capture module or unit 304 for capturing images by the array of imaging devices 104. The capture module 304 may obtain raw image data from each imaging device of the array of imaging devices 104 and store the raw image data in the memory 108 including the database. The capture module 304 may store some or all of the image data in the memory 108. Alternatively, the capture module 304 may store some or all of the image data in another location, such as a network accessible storage location.

The image capture application 202 further includes an image analysis module or unit 306 for performing image analysis on each image captured by the array of imaging devices 104. The image analysis module 306 analyzes features or patterns in the image and may extract each feature or pattern as a possible object to be classified. The image analysis module 306 may determine whether an object is present in each image captured by the array of imaging devices 104. The image analysis module 306 may use computer vision algorithms and a set of objects to detect in images captured by the array of imaging devices 104. A representation of the set of objects may be stored in the memory 108 and may include particular objects, landscapes, shapes, colors, and/or locations of particular importance for the system 100. The objects may include people, animals, road signs (e.g., a stop sign), traffic signals, vehicles, and other objects.

The image capture application 202 further includes a classification module or unit 308 for classifying the objects detected by the image analysis module 306. Each of the objects detected in each image by the image analysis module 306 may have a particular classification. As an example, a first object may be classified as a mountain. A second object may be classified as a road sign. A third object may be classified as a buffalo, etc. The classification may be based on the set of objects stored in the memory that are most similar to the features and patterns determined in the image. Additionally, the classification module or unit 308 may determine that the object in the object portion of a first image captured by an imaging device of the array of imaging devices 104 is a same object as the object in the object portion of a second image by comparing the object portion of the first image and the object portion of the second image to features and patterns in images of objects in the list of known objects.

The image capture application 202 further includes an object module or unit 310 for viewing, adding, deleting, and/or modifying the list of objects that the array of imaging devices 104 may detect. In other words, the list of objects that image capture application 202 captures and stores may be customizable. As an example, the object module 310 may receive input from a user that allows the user to add a new object to the list of objects, e.g., a particular person. The user may provide the image capture application 202 with text and/or images of the object to be found by the image capture application and the image analysis module 306 may use the text and/or images to determine and classify the object. Alternatively, the object module 310 may receive input from the user that allows the user to delete objects from the list of objects or indicate that objects are less important.

The image capture application 202 further includes a weighting module or unit 312 that weights an object portion of each image, e.g., a subset of the image that is determined to include a representation of an object, and/or weights an entire image based on importance information. As an example, the weighting module 312 may weight the object portion of the image that was classified as the mountain at a higher weight level and may weight the object portion of the image that was classified as the road sign at a lower weight level. This weighting information may indicate an importance for the particular object and/or the particular image. The image capture application 202 may compress and/or store images using this weighting information.

In certain instances, such as on a road trip during a vacation far from a home location, the mountain or a known person may have a higher weight. However, in other instances, such as on a busy street during rush hour in a downtown location, the road sign may have a higher weight. In another instance, such as in a location with a higher instance of crime and/or vehicle collisions, an object such as another vehicle or a pedestrian may have a higher weight. The weighting module 312 may use map data (e.g., population information, crime information, traffic information) that may be associated with the current location obtained from the GPS device 116 and may use other information such as other images and weight information for objects captured in images by other computing devices and vehicles at the current location.

Additionally, the weighting module 312 may use information obtained from the sensors 114, such as depth information associated with the object, and other metadata information associated with the image. If the object is distant from the array of imaging devices 104, then the object may be assigned a lower weight. However, if the object is near the array of imaging devices 104, then the object may be assigned a higher weight. The sensors 114 may determine the distance using time-of-flight or another methodology. The distance may be based on information received from a radar device, a lidar device, or a near-infrared device, among others. The array of imaging devices 104 and/or the sensors 114 may be used to determine BRDF information for the object in the image. As a result, the weighting module 312 may weight the object based on the BRDF information.

The image capture application 202 includes a compression module or unit 314 that compresses, encodes, and stores images captured by the array of imaging devices 104. The compression module 314 may compress an image or a portion of an image based on the classification and/or the weighting. In one example, the compression module 314 may discard and not store an image in the memory 108 if there are no objects in the image or if the weighting does not meet a particular threshold. As an example, the compression module 314 may only store an image if there is an object portion within an image with a weight of 0.5. Images captured by the array of imaging devices at approximately the same time having this object portion may be stored in the memory 108. In a particular instance, the image may have an object portion with a weight of 0.25. This compression module 314 may discard this image and all other images captured by the array of imaging devices at approximately the same time having this object portion.

In another example, the compression module 314 may compress an image or at least an object portion of the image based on the classification and/or the weighting. The compression may be at a higher level or more compressed level if the image is deemed to not be important or not include an important object. Alternatively, the compression may be at a lower level or a less compressed level if the image is deemed to be important or include an important object. As an example, the compression module 314 may compress an image and all other images captured by the array of imaging devices at approximately the same time if there is an object portion with a weight of 0.3. In a particular instance, the image may have an object portion with a weight of 0.33. This compression module 314 may compress this image and all related images with the object. The compression level may be a lossless compression level or may be a lossy compression level depending on the weight, among other factors.

The image capture application 202 further includes a user interface module or unit 316 for displaying a user interface on the display 110. As an example, the user interface module 316 generates a native and/or web-based graphical user interface (GUI) that accepts input and provides output viewed by users of the computing device 102. The computing device 102 may provide realtime automatically and dynamically refreshed image capture information. The user interface module 316 may send data to other modules of the image capture application 202 of the computing device 102, and retrieve data from other modules of the image capture application 202 of the computing device 102 asynchronously without interfering with the display and behavior of the user interface displayed by the computing device 102.

The image capture application 202 may be a component of an application and/or service executable by the computing device 102. For example, the image capture application 202 may be a single unit of deployable executable code. According to one aspect, the image capture application 202 may be a web application, a native application, and/or a mobile application (e.g., an app) downloaded from a digital distribution application platform that allows users to browse and download applications developed with mobile software development kits (SDKs).

Figure 4:
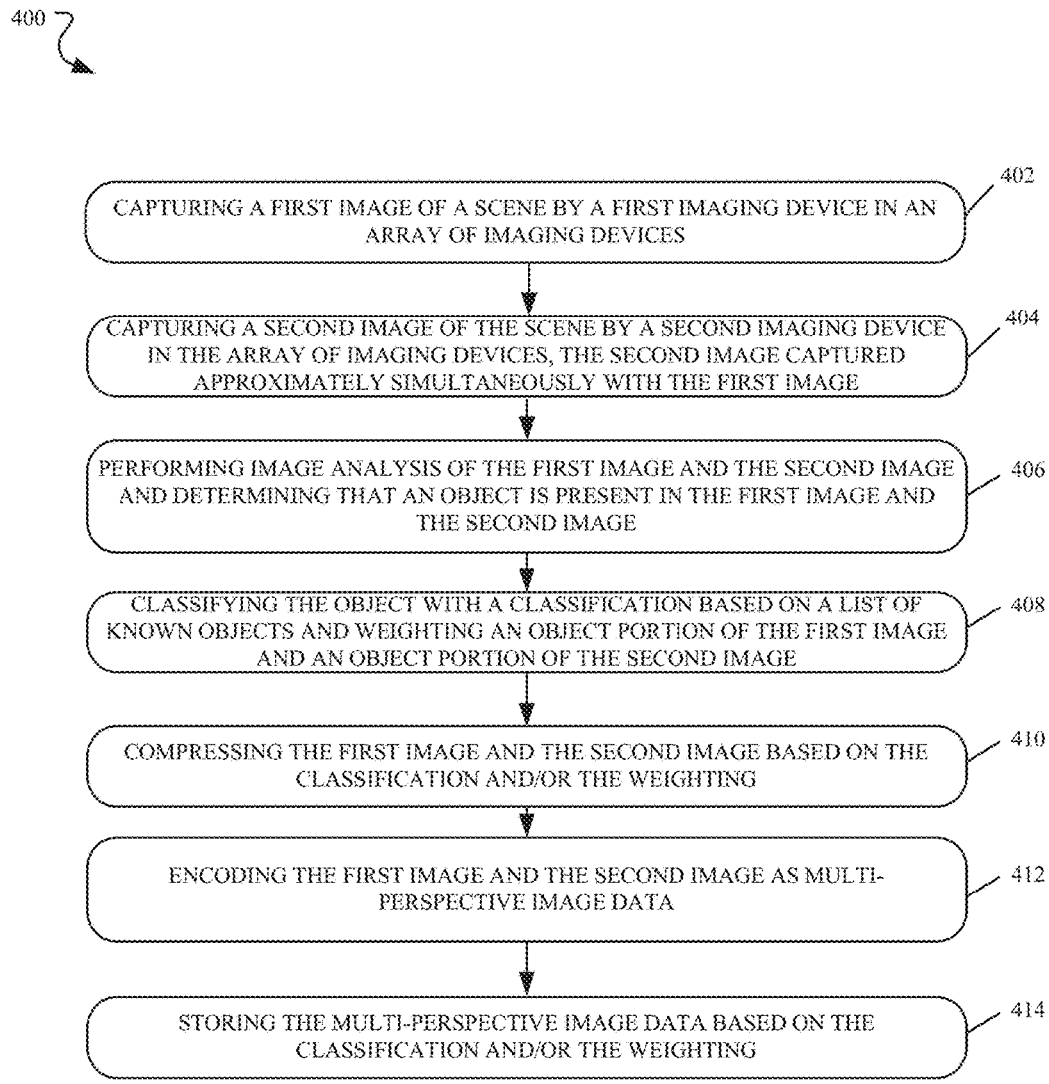
FIG. 4 illustrates a flowchart for capturing images according to an example embodiment.

FIG. 4 illustrates a flowchart of a process 400 for capturing images according to an example embodiment. The process 400 shown in FIG. 4 begins at operation 402.

In 402, the computing device 102 begins capturing images using the array of imaging devices 104. The array of imaging devices 104 may capture a first image/video of a scene by a first imaging device of the array of imaging devices 104. The array of imaging devices 104 may be activated by a user in response to user input. The user input may include a selection of a button on the display 110 or may be a verbal command. Alternatively, the user input may be a gesture may on the touch screen. Even further, the array of imaging devices 104 may automatically begin capturing images based on a current location or when the array of imaging devices determines that a particular object is present in an image.

In 404, the computing device 102 continues capturing images/video using the array of imaging devices 104. The array of imaging devices 104 may capture a second image/video of the scene by a second imaging device of the array of imaging devices 104. The second image may be captured approximately simultaneously with the first image. Other imaging devices in the array of imaging devices 104 also capture images of the scene approximately simultaneously with the first image and the second image. For example, a third image/video may be captured by a third imaging device of the array of imaging devices, a fourth image/video may be captured by a fourth imaging device of the array of imaging devices, and so on.

In 406, the computing device 102 performs image analysis of the first image and the second image and determines that an object is present in the scene. The first image may represent a first perspective of the object and the second image may represent a second perspective of the object that is different from the first perspective of the object.

In 408, the computing device 102 classifies the object in the first image and the second image with a particular classification based on a list of known objects and weights an object portion of the first image, e.g., the subset of the image including the representation of the image, and an object portion of the second image, e.g., the subset of the image including the representation of the image, based on the classification and other information obtained from the sensors 114 and the GPS device 116 such as depth information, BRDF information, map data, and location information. Additionally, the computing device 102 may classify the object in the first image and the second image with a same classification, e.g., a same object is in the first image and the second image. The computing device 102 may determine that the object in the object portion of the first image is a same object as the object in the object portion of the second image by comparing the object portion of the first image and the object portion of the second image to features and patterns in images of objects in the list of known objects and using the depth information, BRDF information, map data, and location information. In one example, the object may be a person or may be a geographic feature such as a mountain or tree. The mountain object portion may be assigned a weight of 0.5 and the tree object portion may be assigned a weight of 0.2.

In 410, the computing device 102 compresses the first image and the second image based on the classification and/or the weighting. As an example, the computing device 102 may compress the object portion of the first image and the object portion of the second image at a particular compression level based on the classification and/or the weighting. As another example, the computing device may compress the object portion of the first image and the object portion of the second image at a first particular compression level based on the classification and/or the weighting and compress a non-object portion of the first image and a non-object portion of the second image at a second particular compression level. The first particular compression level may be a lossless compression level and the second particular compression level may be a lossy compression level. The compression also may be based on the additional information including the depth information, BRDF information, the map data, and the location information.

In 412, the computing device 102 encodes the first image and the second image as multi-perspective image data that represents the object and in 414, the computing device stores the multi-perspective image data in the memory 108. Alternatively, the computing device 102 may discard the first image and the second image when the weighting does not meet a particular threshold or there are no classified objects in the images.

The computing device 102 or another computing device may decode the multi-perspective image data and display a representation of the scene including the first image and the second image, among other images on the display 110 or another display device.

In an exemplary embodiment, the array of imaging devices 104 may be mounted on an exterior of a vehicle and/or may be mounted on an interior of the vehicle. The array of imaging devices 104 may be used to capture and generate a panoramic still image of an environment and/or a video of an environment captured from multiple perspectives. The environment may be viewed from multiple perspectives and the video may be viewed from multiple perspectives on the display 110 and/or another display device.

As an example, the display 110 may display a representation of the scene including displaying the object from a perspective including from an imaging device on a front of a vehicle, an imaging device on a first side of the vehicle, an imaging device on a second side of the vehicle, and an imaging device on a rear of the vehicle. The front of the vehicle, the first side of the vehicle, the second side of the vehicle, and the rear of the vehicle may each include the array of imaging devices 104 (1-N) that may each provide a different perspective. As another example, the display 110 may display a representation of the scene including displaying the object from the first perspective of the object and transitioning to displaying the object from the second perspective of the object.

Figure 5:
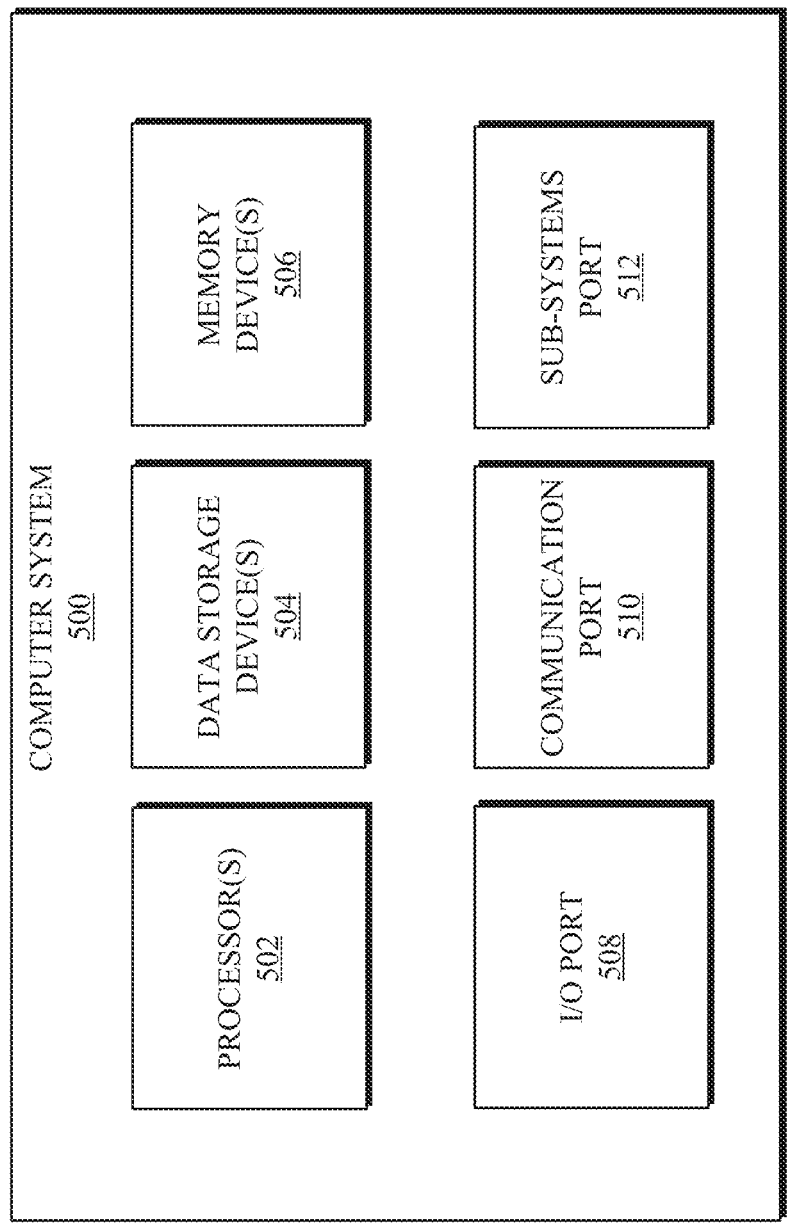
FIG. 5 illustrates a block diagram of an example computer device for use with the example embodiments.

Referring to FIG. 5, a detailed description of an example computing system 500 having computing units that may implement various systems and methods discussed herein is provided. The computing system 500 may be applicable to the computing device 102 and other computing or network devices. It will be appreciated that specific implementations of these devices may be of differing possible specific computing architectures not all of which are specifically discussed herein but will be understood by those of ordinary skill in the art.

The computer system 500 may be a computing system that is capable of executing a computer program product to execute a computer process. Data and program files may be input to the computer system 500, which reads the files and executes the programs therein. Some of the elements of the computer system 500 are shown in FIG. 5, including hardware processors 502, data storage devices 504, memory devices 506, and/or ports 508-512. Additionally, other elements that will be recognized by those skilled in the art may be included in the computing system 500 but are not explicitly depicted in FIG. 5 or discussed further herein. Various elements of the computer system 500 may communicate with one another by way of communication buses, point-to-point communication paths, or other communication means not explicitly depicted in FIG. 5.

The processor 502 may include, for example, a central processing unit (CPU), a microprocessor, a microcontroller, a digital signal processor (DSP), and/or internal levels of cache. There may be processors 502, such that the processor 502 comprises a single central-processing unit, or a number of processing units capable of executing instructions and performing operations in parallel with each other, commonly referred to as a parallel processing environment.

The computer system 500 may be a conventional computer, a distributed computer, or any other type of computer, such as external computers made available via a cloud computing architecture. The presently described technology is optionally implemented in software stored on the data stored device(s) 504, stored on the memory device(s) 506, and/or communicated via the ports 508-512, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The data storage devices 504 may include any nonvolatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the executable instructions or data structures.

In some implementations, the computer system 500 includes ports, such as an input/output (I/O) port 508, a communication port 510, and a sub-systems port 512, for communicating with other computing or network devices. It will be appreciated that the ports 508-512 may be combined or separate and that more or fewer ports may be included in the computer system 500.

The I/O port 508 may be connected to an I/O device, or other device, by which information is input to or output from the computing system 500. Such I/O devices may include, without limitation, input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to communication interface devices configured to transmit and/or receive information between the computing system 500 and other devices by way of wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. Such communication interface devices may be utilized via the communication port 510 to communicate with other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 510 may communicate with an antenna for electromagnetic signal transmission and/or reception. In some examples, an antenna may be employed to receive Global Positioning System (GPS) data to facilitate determination of a location of a machine or another device.

The computer system 500 may include a sub-systems port 512 for communicating with systems.

In an example implementation, object detection information and software and other modules and services may be embodied by instructions stored on the data storage devices 504 and/or the memory devices 506 and executed by the processor 502. The computer system 500 may be integrated with or otherwise form part of a computer. In some instances, the computer system 500 is a portable device that may be in communication and working in conjunction with various systems or sub-systems of a computer.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM);

erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
    an array of imaging devices;
    a processor; and
    a non-transitory computer-readable medium storing instructions that, when executed by the processor, cause the processor to perform operations comprising:
    capturing a first image of a scene by a first imaging device of the array of imaging devices;
    capturing a second image of the scene by a second imaging device of the array of imaging devices;
    performing image analysis of the first image and the second image and determining that an object is present in the first image and the object is present in the second image, the first image representing a first perspective of the object and the second image representing a second perspective of the object different from the first perspective of the object;
    classifying the object with a classification based on a list of known objects and weighting an object portion of the first image and an object portion of the second image based on the classification;
    compressing the first image and the second image based on the weighting, the object portion of the first image and the object portion of the second image being compressed at a particular compression level based on at least one of the classification or the weighting;
    encoding the first image and the second image as multi-perspective image data; and
    storing the multi-perspective image data in the non-transitory computer-readable medium.

2. The system of claim 1, the operations further comprising:
    decoding the multi-perspective image data and displaying a representation of the scene using the first image and the second image.

3. The system of claim 1, the operations further comprising:
    compressing the first image and the second image at a compression level based on one or more of the classification and the weighting.

4. The system of claim 1, the operations further comprising:
    compressing the object portion of the first image and the object portion of the second image at a first particular compression level based on one or more of the classification and the weighting, and compressing a non-object portion of the first image and a non-object portion of the second image at a second particular compression level, the first particular compression level comprising a lossless compression level and the second particular compression level comprising a lossy compression level.

5. The system of claim 1, the operations further comprising:
    discarding the first image and the second image when the weighting does not meet a particular threshold.

6. The system of claim 1, the system further comprising a sensor device, the operations further comprising:
    determining a distance to the object from the first image device and the second imaging device using the sensor device to determine time-of-flight;
    weighting the object portion of the first image and the object portion of the second image based on the distance; and
    compressing the first image and the second image based on the weighting, and encoding the first image and the second image as the multi-perspective image data.

7. The system of claim 1, the system further comprising a Global Positioning System (GPS) device, the operations further comprising:
    determining a location of the object using the GPS device;
    weighting the object portion of the first image and the object portion of the second image based on the location of the object; and
    compressing the first image and the second image based on the weighting, and encoding the first image and the second image as the multi-perspective image data.

8. The system of claim 1, the operations further comprising:
    determining bidirectional reflectance distribution function (BRDF) information for the object based on the first image and the second image;
    weighting the object portion of the first image and the object portion of the second image based on the BRDF information; and
    compressing the first image and the second image based on the weighting, and encoding the first image and the second image as the multi-perspective image data.

9. The system of claim 1, the operations further comprising:
    activating the array of imaging devices to begin capturing images in response to user input, the user input comprising input to one or more of a touch screen device and a microphone.

10. The system of claim 1, the operations further comprising:
    activating the array of imaging devices to begin capturing images in response to user input, the user input comprising one or more of a gesture made on a touch screen and a verbal command.

11. The system of claim 1, the operations further comprising:
    activating the array of imaging devices to begin capturing images when the array of imaging devices determine that the object is present in one or more of the first image and the second image.

12. The system of claim 1, the system further comprising a Global Positioning System (GPS) device, the operations further comprising:
    determining a location using the GPS device;
    activating the array of imaging devices to begin capturing images based on the location.

13. The system of claim 1, the system further comprising a vehicle, the array of imaging devices mounted on an exterior of the vehicle.

14. The system of claim 1, the system further comprising a vehicle, the array of imaging devices mounted on an interior of the vehicle.

15. The system of claim 1, the operations further comprising:
generating a panoramic image of the object using the multi-perspective image data.

16. The system of claim 1, the operations further comprising:
displaying a representation of the scene including displaying the object from a perspective including a front of a vehicle, a first side of the vehicle, a second side of the vehicle, and a rear of the vehicle.

17. The system of claim 1, the operations further comprising:
displaying a representation of the scene including displaying the object from the first perspective of the object and transitioning to displaying the object from the second perspective of the object.

18. The system of claim 1, the image analysis further comprising:
determining the object in the object portion of the first image is a same object as the object in the object portion of the second image by comparing the object portion of the first image and the object portion of the second image to features and patterns in images of objects in the list of known objects.

19. The system of claim 18, the image analysis further comprising determining that the object in the object portion of the first image is the same object as the object in the object portion of the second image based on depth information, BRDF information, map data, and location information.

20. The system of claim 18, the image analysis further comprising determining the object portion of the first image as a subset of the first image representing the object and determining the object portion of the second image as a subset of the second image representing the object.

21. A method comprising:
obtaining a first image of a scene captured by a first imaging device of an array of imaging devices;
obtaining a second image of the scene captured by a second imaging device of the array of imaging devices;
performing, by at least one processor, image analysis of the first image and the second image and determining that an object is present in the first image and the object is present in the second image, the first image representing a first perspective of the object and the second image representing a second perspective of the object different from the first perspective of the object;
classifying, by the at least one processor, the object with a classification based on a list of known objects and weighting an object portion of the first image and an object portion of the second image based on the classification;
compressing the first image and the second image based on the weighting, the object portion of the first image and the object portion of the second image being compressed at a particular compression level based on at least one of the classification or the weighting;
encoding the first image and the second image as a multi-perspective image data; and
storing the multi-perspective image data in a non-transitory computer-readable medium.

22. A non-transitory computer-readable medium comprising instructions stored thereon that, when executed by a processor, cause the processor to perform operations comprising:
obtaining a first image of a scene captured by a first imaging device of an array of imaging devices;
obtaining a second image of the scene captured by a second imaging device of the array of imaging devices;
performing image analysis of the first image and the second image and determining that an object is present in the first image and the object is present in the second image, the first image representing a first perspective of the object and the second image representing a second perspective of the object different from the first perspective of the object;
classifying the object with a classification based on a list of known objects and weighting an object portion of the first image and an object portion of the second image based on the classification;
compressing the first image and the second image based on the weighting, the object portion of the first image and the object portion of the second image being compressed at a particular compression level based on at least one of the classification or the weighting; and
encoding the first image and the second image as multi-perspective image data, the multi-perspective image data being stored according to at least one of the classification or the weighting.

* * * * *